US012771086B2

(12) United States Patent
Simonin et al.

(10) Patent No.: US 12,771,086 B2
(45) **Date of Patent: *Oct. 20, 2026**

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR); Bruno Constant, Tours (FR); Benoit Arnault, Saint-Cyr-sur-Loire (FR)

(73) Assignee: AKTIEBOLAGET SKF, Gothenburg (SE)

(*) Notice: Subject to any disclaimer, the term of this patent is extended or adjusted under 35 U.S.C. 154(b) by 161 days.

This patent is subject to a terminal disclaimer.

(21) Appl. No.: 18/809,475

(22) Filed: Aug. 20, 2024

(65) Prior Publication Data

US 2025/0079783 A1 Mar. 6, 2025

(30) Foreign Application Priority Data

Aug. 30, 2023 (FR) ...................................... 2309084

(51) Int. Cl.
*H01R 39/39* (2006.01)
*H02K 11/40* (2016.01)

(52) U.S. Cl.
CPC ............. *H01R 39/39* (2013.01); *H02K 11/40* (2016.01)

(58) Field of Classification Search
CPC ......... H02K 11/40; H02K 13/10; H01R 39/39
See application file for complete search history.

(56) References Cited

U.S. PATENT DOCUMENTS

| | | | |
|---|---|---|---|
| 11,486,445 | B2 | 11/2022 | Berruet et al. |
| 2016/0111941 | A1 | 4/2016 | Sturm et al. |
| 2017/0108047 | A1 | 4/2017 | White et al. |
| 2021/0021180 | A1 | 1/2021 | Hubert et al. |
| 2021/0310517 | A1 | 10/2021 | Berruet et al. |

(Continued)

FOREIGN PATENT DOCUMENTS

| | | | |
|---|---|---|---|
| CN | 116598858 | A | 8/2023 |
| DE | 102019207241 | A1 | 11/2020 |

(Continued)

OTHER PUBLICATIONS

Preliminary Search Report from the French Patent Office dated Mar. 29, 2024 in related French application No. FR2309084, including Search Report and Written Opinion.

(Continued)

*Primary Examiner* — Sean Gugger
(74) *Attorney, Agent, or Firm* — J-TEK LAW PLLC; Scott T. Wakeman; Mark A. Ussai

(57) ABSTRACT

A grounding brush assembly includes a grounding brush including a support and a plurality of conductive fibers disposed within the support, and a brush mounting plate secured to the support of the brush. The mounting plate includes a radial portion and at least one centering portion extending at least axially from the radial portion, which is offset radially outwardly with respect to the support and has an outer surface defining the outside diameter of the mounting plate. The mounting plate includes at least one spacer tongue protruding from the radial portion on the side opposite the support.

10 Claims, 8 Drawing Sheets

(56) References Cited

U.S. PATENT DOCUMENTS

| | | | | |
|---|---|---|---|---|
| 2021/0364040 | A1 | 11/2021 | Arnault et al. | |
| 2022/0294319 | A1 | 9/2022 | Arnault et al. | |
| 2023/0261555 | A1* | 8/2023 | Arnault | F16C 41/002 310/71 |

FOREIGN PATENT DOCUMENTS

| | | | |
|---|---|---|---|
| DE | 102021114965 | A1 | 12/2022 |
| FR | 3110650 | A1 | 11/2021 |
| FR | 3120754 | A1 | 9/2022 |
| FR | 3132806 | A1 | 8/2023 |
| KR | 102444892 | B1 | 9/2022 |

OTHER PUBLICATIONS

Unpublished U.S. Appl. No. 18/809,487, first named inventor: Anthony Simonin, filing date: Aug. 20, 2024.

Unpublished U.S. Appl. No. 18/809,494, first named inventor: Anthony Simonin, filing date: Aug. 20, 2024.

Unpublished U.S. Appl. No. 18/809,517, first named inventor: Anthony Simonin, filing date: Aug. 20, 2024.

* cited by examiner

GROUNDING BRUSH ASSEMBLY

CROSS-REFERENCE

This application claims priority to French patent application no. 2309084 filed on Aug. 30, 2023, the contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between the housing of the electric motor or machine and the rotary shaft so as to support this shaft. In operation, as the shaft rotates, an electrical potential difference can appear between the shaft and the housing of the electric motor or machine, which produces an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is known practice to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

Due to the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

For further detail regarding the design of such a grounding brush assembly, reference may be made, for example, to US Patent Publication No. 2021/0021180 A1, which describes an assembly comprising a grounding brush provided with a plurality of conductive fibers, a support inside which the conductive fibers are mounted, and an annular mounting plate comprising a plurality of tongues for the radial and axial retention of the support.

Depending on the relative axial positions of the grounding brush assembly and the bearing, there may be contact, during the operation of the electric machine, between the conductive fibers of the assembly on the one hand, and the rolling elements and/or the inner race of the bearing on the other hand. This contact may damage the bearing.

SUMMARY OF THE INVENTION

The present invention aims to remedy the drawback discussed above and relates to a grounding brush assembly comprising a grounding brush provided with a plurality of conductive fibers and with a support inside which the conductive fibers are mounted. The assembly also comprises a brush mounting plate which is secured to the support of the brush.

The mounting plate comprises a radial portion and at least one centering portion extending the radial portion at least axially, which is offset radially outwards with respect to the support and has an outer surface defining the outside diameter of the mounting plate.

According to a general feature, the mounting plate comprises at least one spacer tongue protruding from the radial portion on the side opposite the support.

With this design, the risk of contact between the conductive fibers of the assembly and the bearing is limited. To be specific, the at least one spacer tongue of the mounting plate makes it possible to keep an axial space between the brush and the bearing or the housing.

According to one design, the at least one spacer tongue of the mounting plate protrudes axially. According to another design, the spacer tongue(s) is/are bent over axially against the radial portion.

In one embodiment, the mounting plate comprises a plurality of tongues for retention of the support of the brush, extending from the radial portion, the centering portion being offset radially outwards with respect to the retention tongues. The at least one spacer tongue is distinct from the retention tongues and extends axially on the side opposite the retention tongues.

The one or more spacer tongues of the mounting plate may be offset radially inwardly with respect to the centering portion.

According to a particular design, the at least one spacer tongue is made in one piece or integral with the radial portion of the mounting plate. This simplifies the manufacture of the mounting plate. The at least one spacer tongue may be formed by locally deforming the material of the radial portion.

According to another design, the at least one spacer tongue may be a separate part which is distinct from the radial portion of the mounting plate and is attached thereto by any appropriate means, for example by adhesive bonding, welding, brazing, etc. After attachment, the spacer tongue protrudes from the radial portion of the mounting plate.

With such a design, it may be possible to make the at least one spacer tongue from a material different to the material of the radial portion of the mounting plate. The tongue may for example be made from a material which is electrically insulating, in other words electrically non-conductive. This makes it possible to prevent the dissipation of electrical charge to the bearing in the event of contact between the latter and the tongue. The tongue may for example be made from a synthetic material, from plastic, in particular from PEEK, PBT, PPS, PAI.

In one embodiment, the mounting plate comprises at least two spacer tongues protruding from the radial portion on the side opposite the support, and diametrically opposite to each other.

The brush may be mounted axially against the radial portion of the mounting plate. Alternatively, the brush may be mounted axially against another radial portion of the mounting plate.

The mounting plate may be made as a single piece.

In one embodiment, the mounting plate comprises a plurality of centering portions spaced apart in the circumferential direction. In another embodiment, the mounting plate may comprise an annular centering portion.

The invention further relates to an electric motor comprising a housing, a shaft and at least one grounding brush assembly as defined hereinabove and mounted radially between the housing and the shaft, the conductive fibers of the brush of the assembly being in contact with the shaft.

BRIEF DESCRIPTION OF THE SEVERAL VIEWS OF THE DRAWINGS

The present invention will be better understood on studying the detailed description of embodiments, given by way of non-limiting examples and illustrated by the appended drawings, in which.

DETAILED DESCRIPTION OF THE INVENTION

Figure 1:
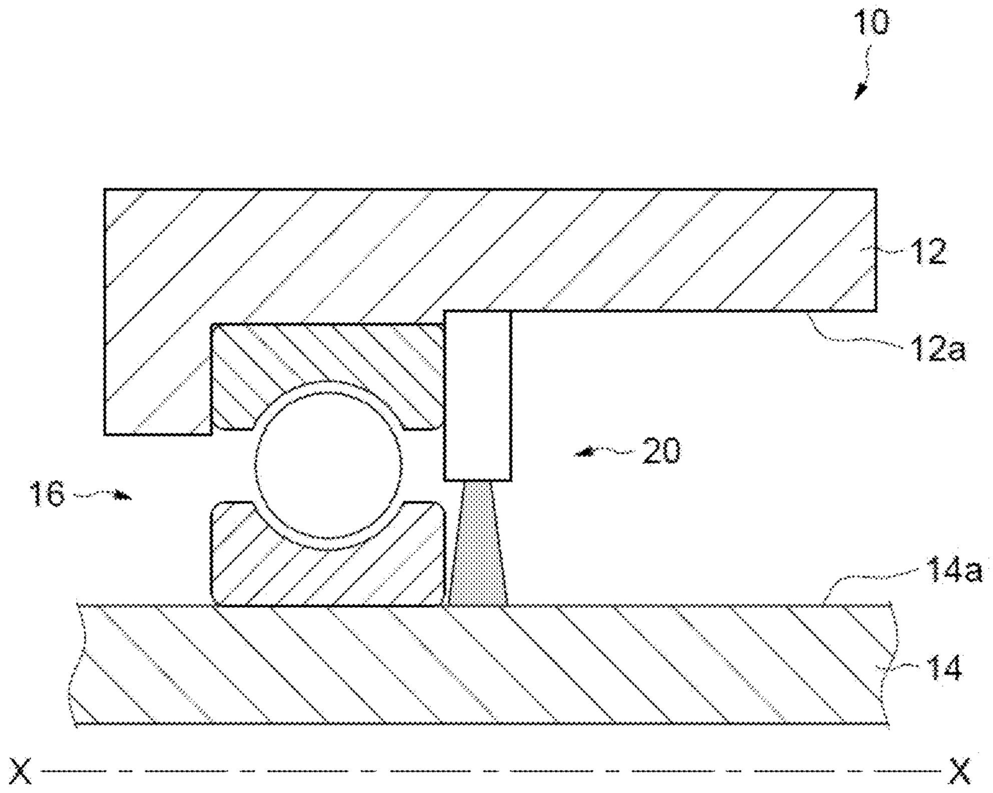
FIG. 1 is a view in axial section of a grounding brush assembly mounted radially between a rotary shaft and a housing of an electric motor.

FIG. 1 shows, in axial section, part of an electric motor 10 or machine comprising a fixed housing 12, a rotary shaft 14, of axis X-X, which is supported radially by a rolling bearing 16. The bearing 16 is mounted radially between the housing 12 and the rotary shaft 14. In this instance, the bearing 16 is of the ball bearing type. As an alternative, it is possible to provide other types of rolling elements or even to form the bearing 16 as a plain journal bearing.

The motor 10 further comprises a grounding brush assembly 20 which is mounted radially between the bore 12*a* of the housing 12 and the outer cylindrical surface 14*a* of the rotary shaft 14.

The grounding brush assembly 20 serves to continuously dissipate the electrical charge that builds up on the shaft 14 of the motor when the motor 10 is in operation, by transferring this charge to the housing 12.

A grounding brush assembly 20 according to an exemplary embodiment of the invention will now be described with reference to FIGS. 2-5.

The grounding brush assembly 20 has an annular overall shape. The assembly 20 comprises a grounding brush 30 and a brush mounting plate 40 which is configured to radially center the brush 30.

As will be described in more detail below, the mounting plate 40 is also configured to keep or maintain an axial space between the brush 30 and the bearing 16 or the housing 12.

The brush 30 comprises a plurality of conductive individual fibers 31 which are intended to come around or surround the rotary shaft 14 of the motor 10. The conductive fibers 31 may be made from carbon, stainless steel, conductive plastics, such as fibers made from acrylic or nylon, or any other appropriate conductive material.

The brush 30 further comprises a holding or support member 32, inside which the conductive fibers 31 are mounted. In the exemplary embodiment illustrated, the support 32 is in the form of an open ring. The support 32 may be produced by cutting and pressing, i.e., in a stamping operation. The support 32 is made from an electrically conductive material such as aluminum, stainless steel, bronze, copper or another material. Alternatively, the support 32 may be made from an electrically non-conductive material with a conductive coating or a conductive paint applied to the support 32.

Figure 5:
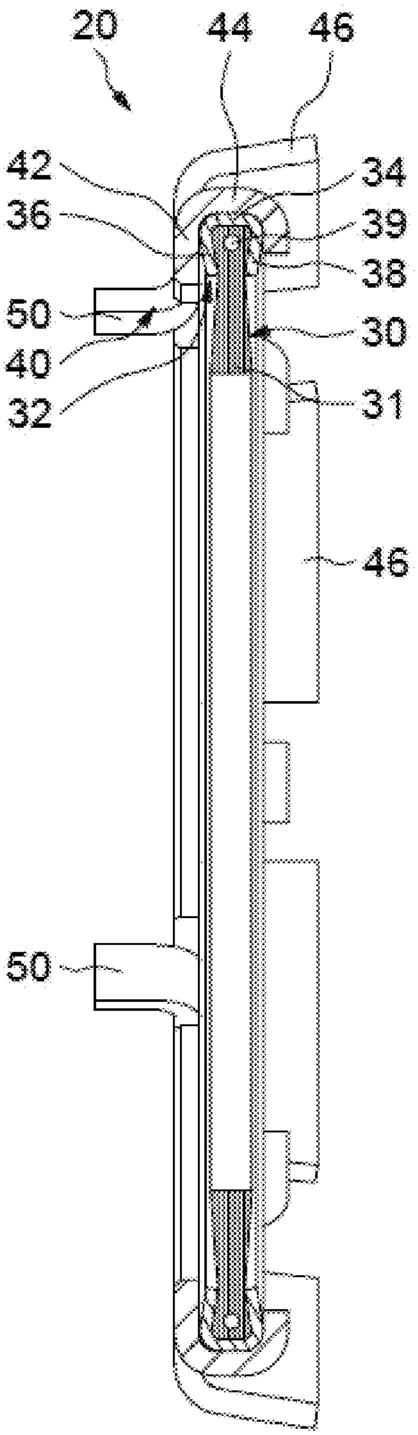
FIG. 5 is a section view along line V-V of FIG. 4.

As shown more clearly in FIG. 5, the support 32 comprises an axial mounting portion 34 and two opposite lateral flanks 36, 38 extending inwards from the mounting portion 34 and axially gripping the conductive fibers 31. The conductive fibers 31 press axially on each side against the lateral flanks 36, 38. The conductive fibers 31 press axially on each side against the internal faces of the lateral flanks 36, 38.

The mounting portion 34 and the two lateral flanks 36, 38 delimit a channel which is open radially on the inside and inside which the conductive fibers 31 are partially positioned.

In the example illustrated, the conductive fibers 31 are bent around a connecting wire 39 of the support 32. The free distal end of the conductive fibers 31 is intended to come into radial contact with the outer surface of the rotary shaft 14 of the motor 10. The proximal end of the conductive fibers 31 is in radial contact with the mounting portion 34 of the support 32.

The lateral flank 36 extends one end of the mounting portion 34, and the lateral flank 38 extends the opposite end of the portion 34. The lateral flanks 36, 38 extend obliquely inwardly from the mounting portion 34. The lateral flanks 36, 38 are symmetrical with each other about a radial midplane of the support 32. The mounting portion 34 here extends axially. Alternatively, the mounting portion 34 could extend obliquely.

Figure 2:
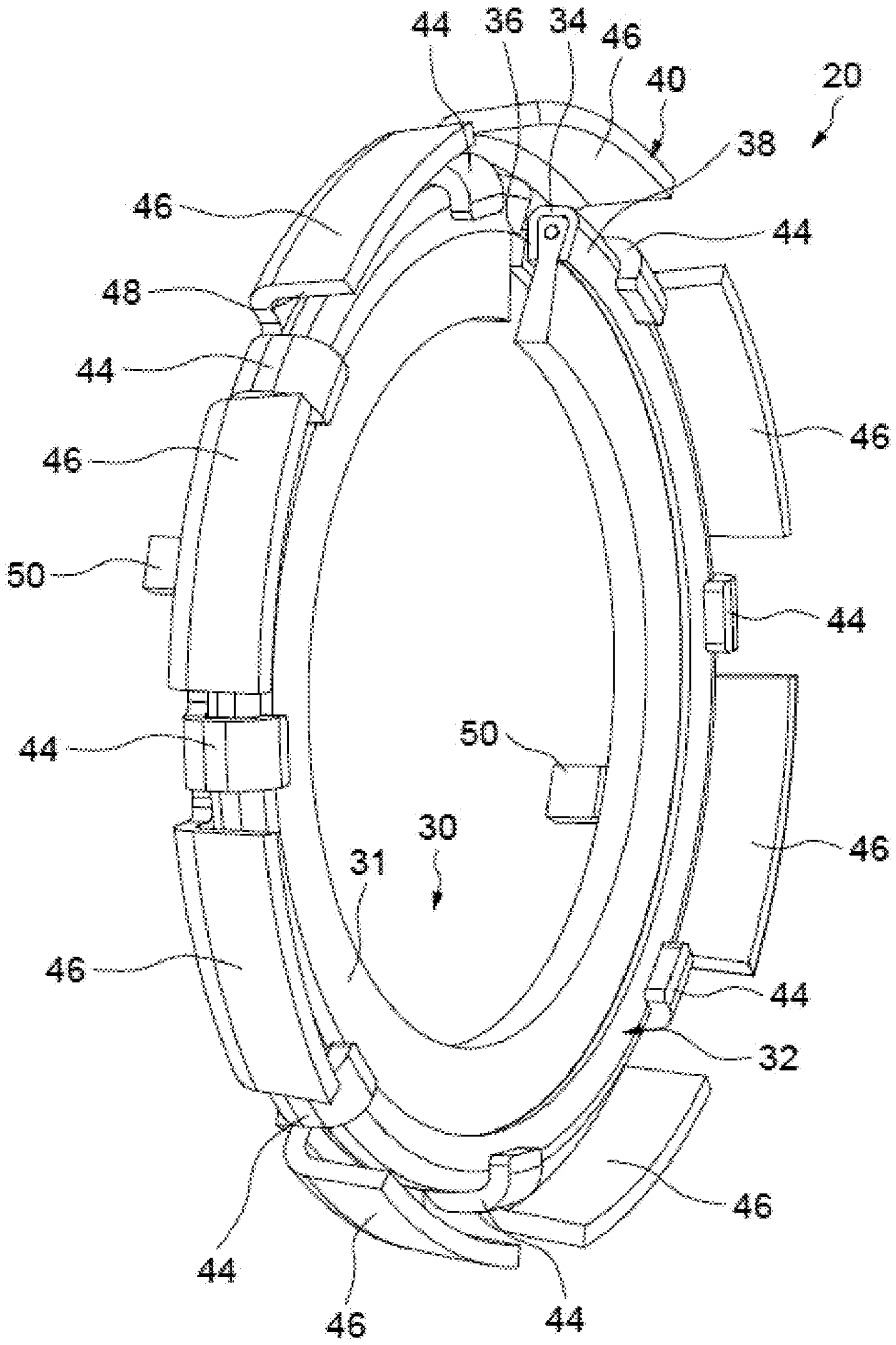
FIG. 2 is a front perspective view of a grounding brush assembly according to a first exemplary embodiment of the invention.
Figure 3:
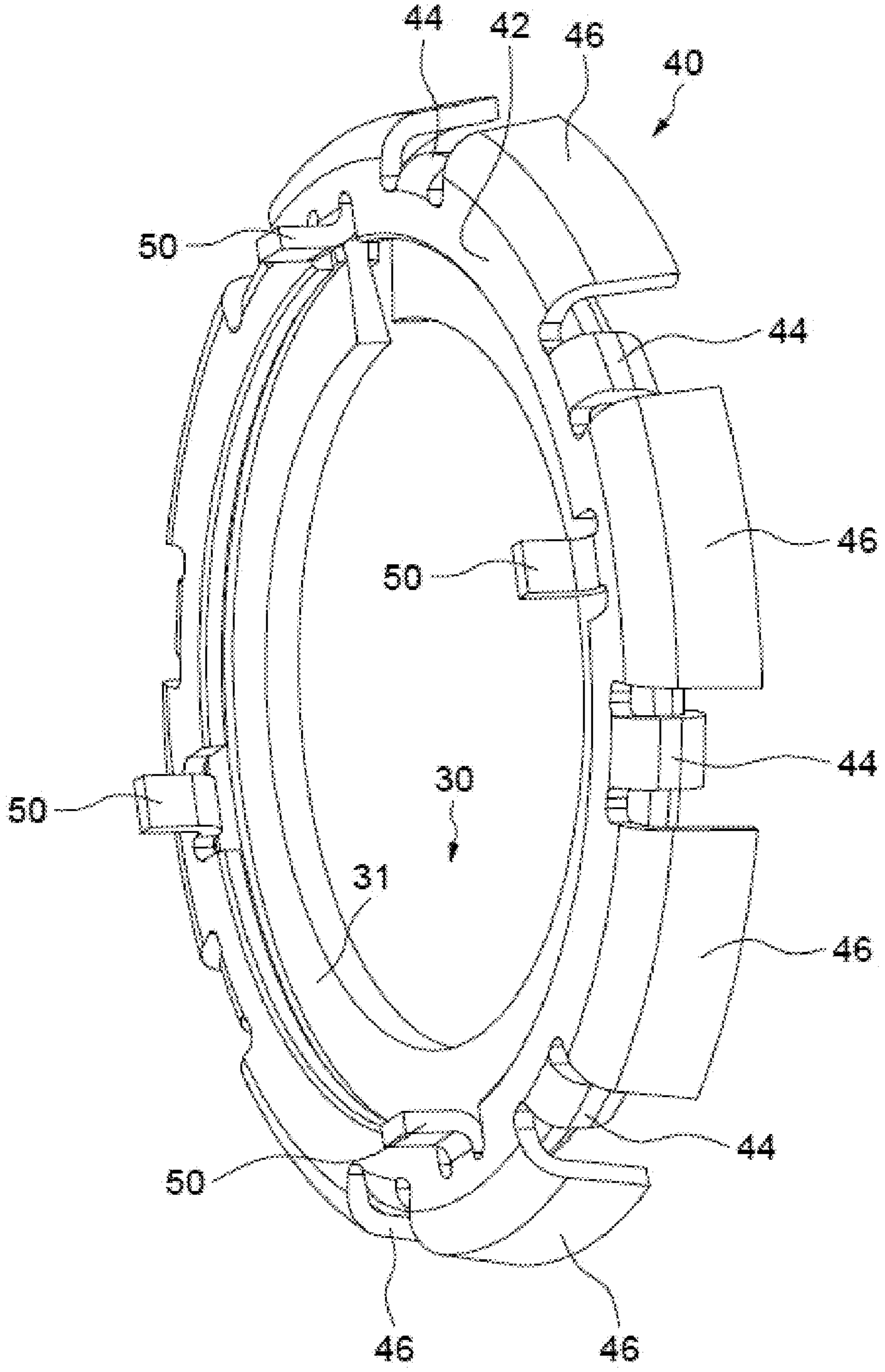
FIG. 3 is a rear perspective view of the grounding brush assembly according to the first exemplary embodiment of the invention.

As stated above, the brush 30 is in the form of an open ring, as can be seen in particular in FIGS. 2 and 3. This allows the brush 30 to adapt to suit or fit different diameters of motor shaft 14. In general, the circumferential ends of the brush 30 are not joined together. As a variant, it is possible to join these ends of the brush 30 together.

With reference to FIGS. 2, 3 and 5, the mounting plate 40 comprises an annular radial portion 42 and a plurality of retention tongues 44 extending from the radial portion 42.

The radial portion 42 of the mounting plate 40 bears axially against the support 32 of the brush 30. More specifically, the radial portion 42 bears axially against the lateral flank 36 of the support 32.

The retention tongues 44 are spaced apart from one another in the circumferential direction, in this instance evenly. As an alternative, it could be possible to provide an irregular or staggered circumferential spacing. In the illustrated exemplary embodiment, there are eight retention tongues 44. As an alternative, it is possible to provide a greater or smaller number of tongues 44. It is possible to provide two tongues 44, or at least four tongues 44. Preferably, the number of tongues 44 is at least equal to two.

Each retention tongue 44 protrudes axially with respect to the radial portion 42. Each tongue 44 locally radially surrounds the support 32 of the brush 30 and is in radial contact with the mounting portion 34 of the support 32. The support 32 is held axially bearing against the radial portion 42 of the mounting plate 40 by the retention tongues 44. The tongues 44 serve for axially and radially retaining the grounding brush 30. The lateral flank 36 of the support 32 bears against the radial portion 42 of the mounting plate 40, and the lateral flank 38 bears against the tongues 44. The retention tongues 44 are in this case substantially identical to each other.

As shown more clearly in FIG. 5, each retention tongue 44 is provided with an axial portion extending axially from the radial portion 42, locally radially surrounding the support 32 and in radial contact therewith, and with a bent-over portion at the free end of the axial portion. The bent-over portion of each retention tongue 44 serves for axially retaining the support 32 of the grounding brush 30. The bent-over portion of each tongue 44 is in axial contact against the lateral flank 38 of the support 32.

The mounting plate 40 of the brush assembly 20 also includes a plurality of centering tabs 46 extending from the radial portion 42 and spaced apart from one another in the circumferential direction, each centering tab 46 being engageable with the bore 12*a* of the housing 12. A cutout 48 (FIG. 2) is formed on the radial portion 42 of the plate 40 between each pair of immediately successive centering tabs 46. The centering tabs 46 are formed by cutting and bending portions of the radial portion 42 of the mounting plate 40.

Each centering tab 46 extends axially from the radial portion 42. The centering tabs 46 extend obliquely from a large-diameter edge of the radial portion 42. The tabs 46 extend axially from the same side of the radial portion 42 as the tongues 44.

Each centering tab 46 locally radially surrounds the support 32 of the brush 30 while remaining separated therefrom. The tabs 46 are partially offset radially outwardly with respect to the retention tongues 44. The centering tabs 46 are in this case substantially identical to each other. The tabs 46 define the outside diameter of the mounting plate 40. Each tab 46 preferably extends obliquely. Alternatively, the centering tabs 46 could extend axially. Each tab 46 is in the form of a portion of a cylinder. The bore in each tab 46 is radially spaced apart from the support 32 by a non-zero radial distance. The outer surfaces of the tabs 46 define the outside diameter of the mounting plate 40. The tabs 46 provide the centering of the mounting plate 40 once the grounding brush assembly 20 has been mounted in the bore 12*a* of the housing 12 of the associated electric motor 10.

Figure 4:
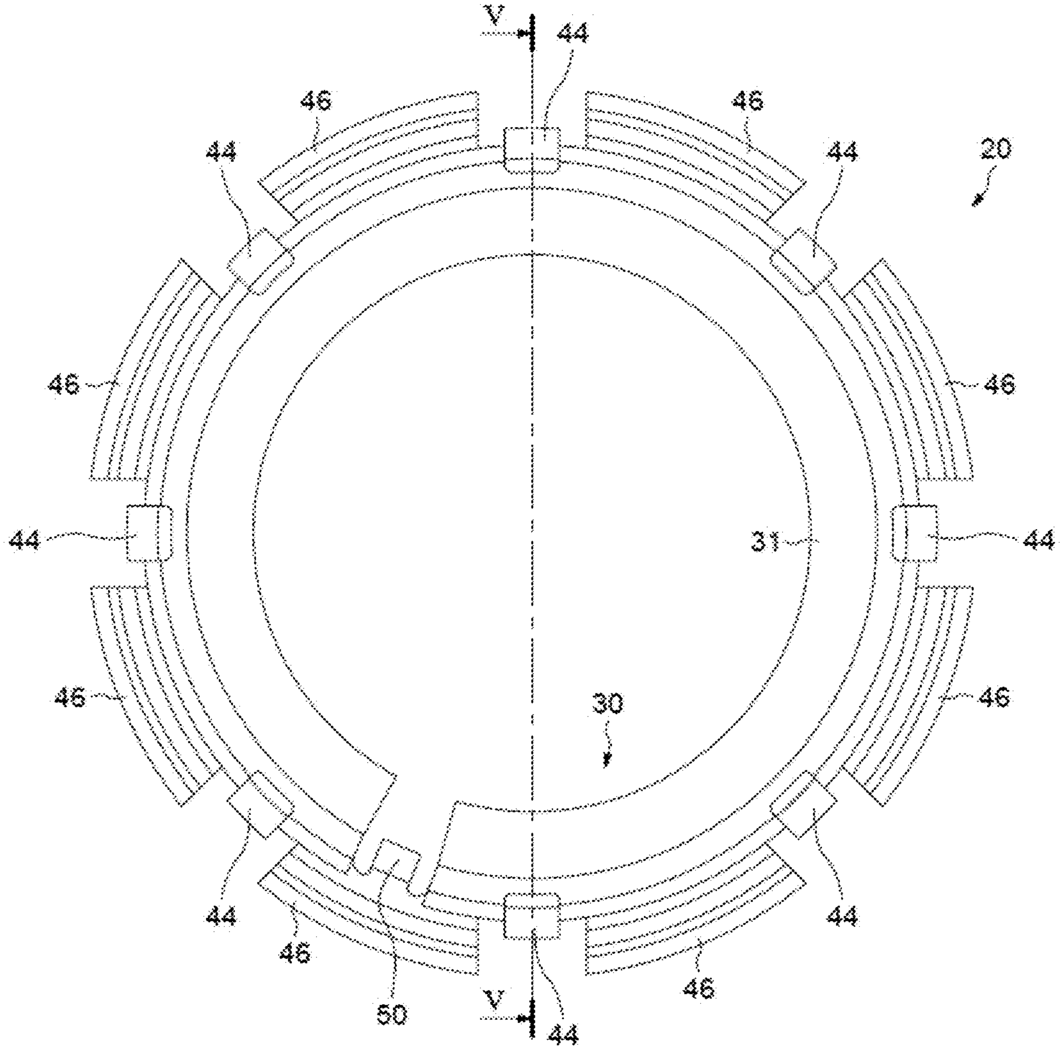
FIG. 4 is a front plan view of the grounding brush assembly of FIGS. 2 and 3.

As illustrated in FIGS. 2 and 4, the centering tabs 46 are spaced apart from one another in the circumferential direction, in this instance evenly. As an alternative, it could be possible to provide an irregular or staggered circumferential spacing. Each tab 46 is positioned in the circumferential direction between two immediately successive retention tongues 44. Each tab 46 is spaced apart in the circumferential direction from the two immediately adjacent tongues 44. In this instance, each centering tab 46 has a circumferential dimension greater than that of the retention tongues 44.

As stated above, the mounting plate 40 is also configured to maintain and/or establish an axial space between the brush 30 and the bearing 16 or the housing 12.

For this purpose, the mounting plate 40 further comprises at least one and preferably a plurality of spacer tongues 50 extending axially from the radial portion 42 on the side opposite the retention tongues 44 and the centering tabs 46, as can be seen in FIGS. 2, 3, and 5. The at least one spacer tongue 50 extends axially on the side of the mounting plate 40 opposite the support 32. The tongue(s) 50 protrude outwardly with respect to the radial portion 42 of the mounting plate 40. Preferably, the spacer tongue(s) 50 extend at least axially from the radial portion 42, but may alternatively extend obliquely, in other words both axially and radially.

The radial portion 42 of the mounting plate 40 has an internal face against which the support 32 is mounted, pressing axially thereon, and an external face axially opposite the internal face. The internal and external faces delimit the axial thickness of the radial portion 42 of the mounting plate 40. The spacer tongues 50 protrude axially with respect to the external face of the radial portion 42.

Each spacer tongue 50 is positioned radially between the small-diameter edge of the radial portion 42 delimiting the bore in the mounting plate 40, and the large-diameter edge of the radial portion 42. The root of each tongue 50 is positioned radially on the side of the large-diameter edge of the radial portion 42. The root of each spacer tongue 50 has a curved shape and the tongue 50 extends axially from this root. Each spacer tongue 50 is offset radially towards the inside with respect to the retention tongues 44 and the centering tabs 46.

Each spacer tongue 50 is positioned in the circumferential direction in the extension of one of the centering tabs 46. Each tongue 50 is positioned in the circumferential direction between two immediately successive tongues 44. Each spacer tongue 50 has a reduced circumferential dimension by comparison with that of the centering tabs 46. In this instance, each spacer tongue 50 also has a reduced circumferential dimension in comparison with that of the retention tongues 44. As an alternative, the circumferential dimension of the spacer tongues 50 may be greater than or equal to those of the retention tongues 44.

In the example illustrated, the main faces of each spacer tongue 50 delimiting the thickness of the tongue are oriented radially. In other words, in this example, one of the main faces of each tongue 50 is oriented radially inwardly and the other main face is oriented radially outwardly.

The spacer tongues 50 are spaced apart from one another in the circumferential direction, in this instance evenly or regularly. As an alternative, it could be possible to provide an irregular or staggered circumferential spacing. In the exemplary embodiment illustrated, there are four spacer tongues 50. As an alternative, it is possible to provide a greater or smaller number of spacer tongues 50. Preferably, the number of tongues 50 is at least equal to two. The tongues 50 are in this case identical to one another. As a variant, the tongues 50 may have different shapes and/or dimensions.

The mounting plate 40 is preferably fabricated by cutting and pressing in a stamping operation. The mounting plate 40 is preferably made from a conductive material such as aluminum, stainless steel, bronze, copper or another material. Alternatively, the mounting plate 40 may be made from an electrically non-conductive material with a conductive coating or a conductive paint applied to the plate 40. In this instance, the mounting plate 40 is made as a single piece, i.e., one-piece construction.

During operation of the electric machine, any electric charge that builds up on the shaft 14 is dissipated to the housing 12 through the conductive fibers 31, the support 32 of the brush 30, and the mounting plate 40 of the brush assembly 20.

By virtue of the spacer tongues 50 of the mounting plate 40, contact between the conductive fibers 31 of the brush 30 and the bearing 16 is prevented.

Figure 6:
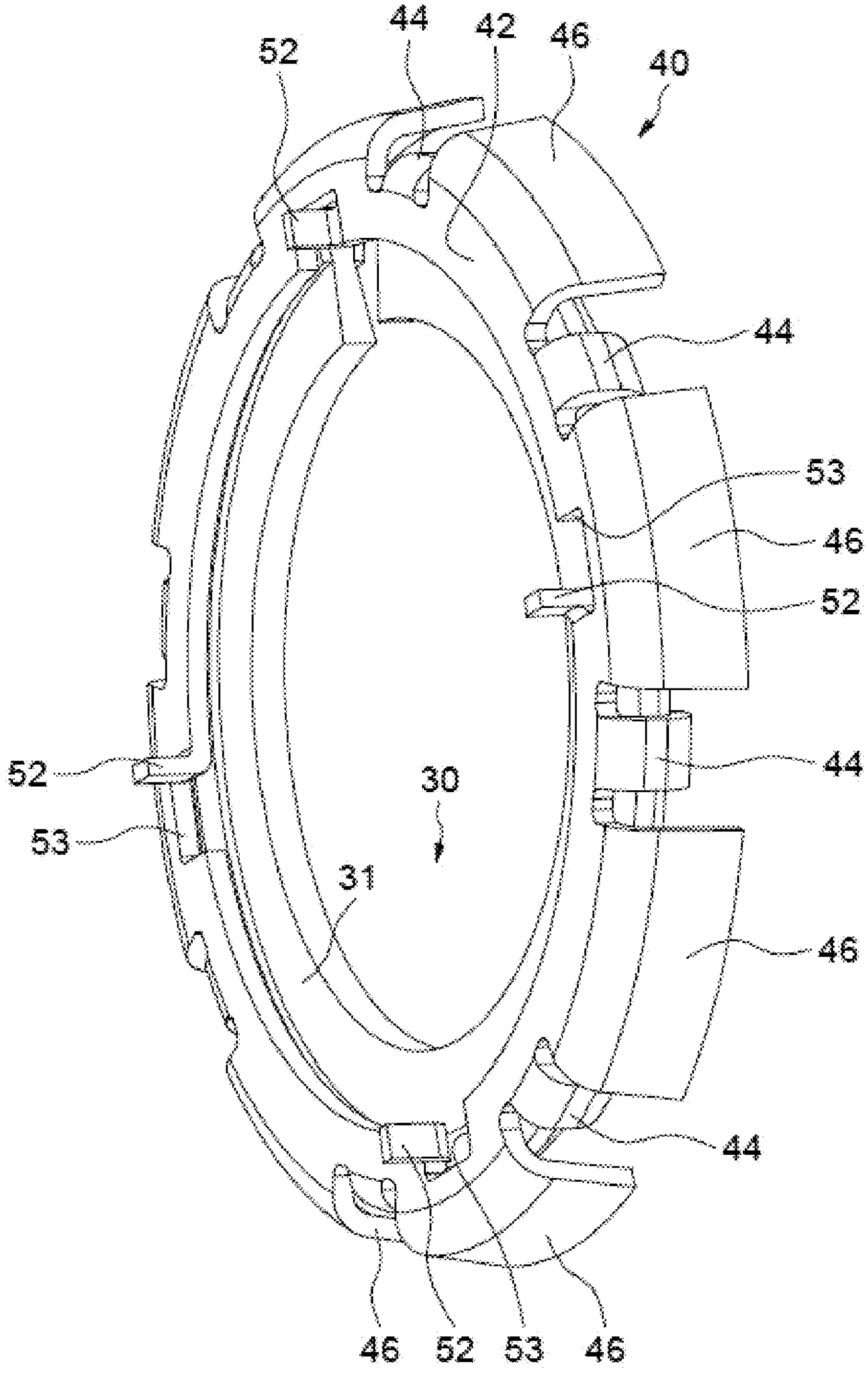
FIG. 6 is a rear perspective view of the grounding brush assembly according to a second exemplary embodiment of the invention.

The exemplary embodiment illustrated in FIG. 6, in which identical elements bear the same references, only differs from the above example by way of the orientation of the root of the spacer tongues 52 of the mounting plate 40.

The spacer tongues 52 are formed in this instance by making cuts 53 on the radial portion 42 of the mounting plate 40, and the root of each tongue 52 is connected to a lateral edge delimiting the associated opening 53. Thus, one of the main faces of each tongue 52 is oriented circumferentially on one side, and the other main face is oriented circumferentially on the opposite side.

Figure 7:
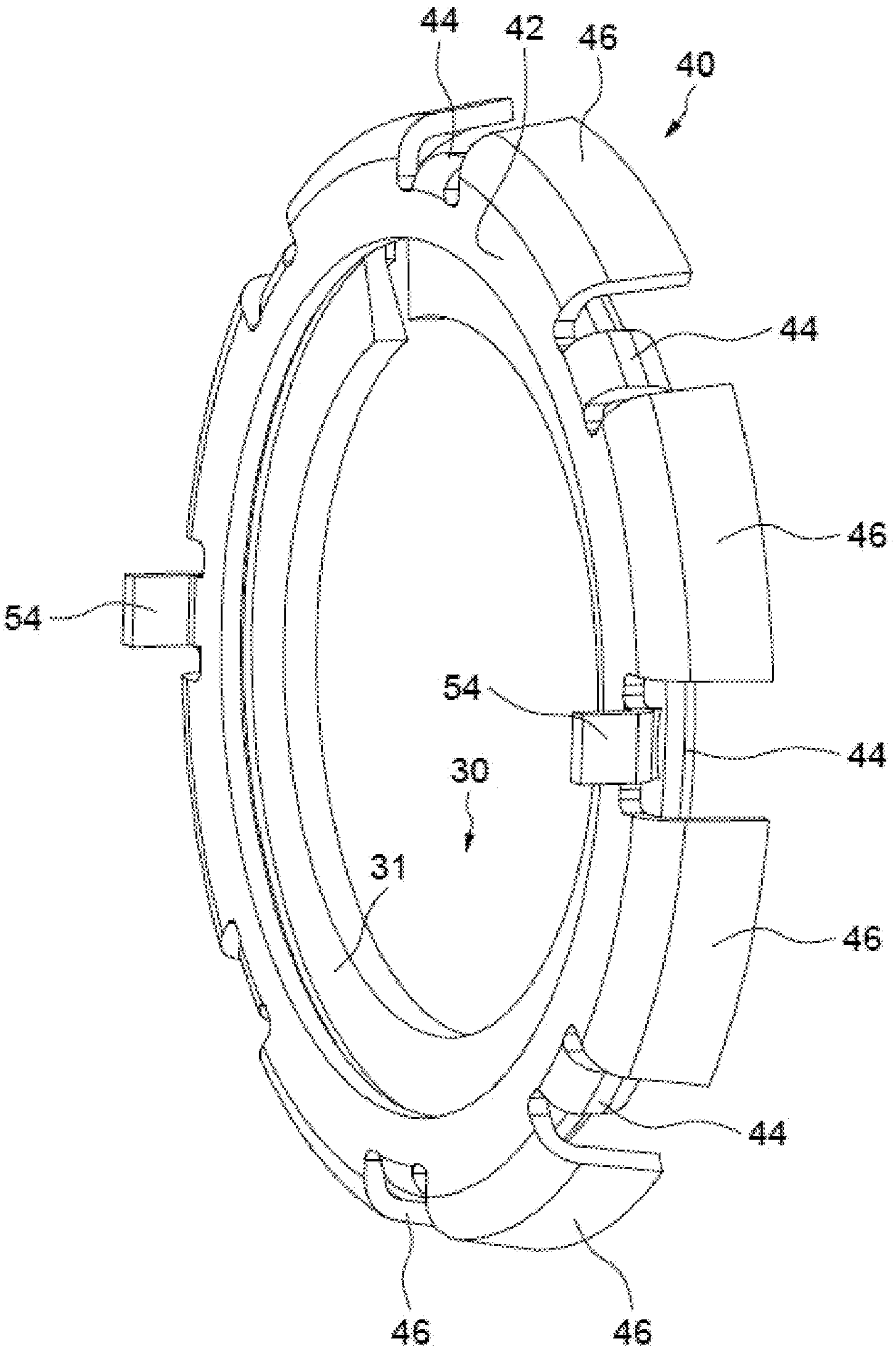
FIG. 7 is a rear perspective view of the grounding brush assembly according to a third exemplary embodiment of the invention.

The exemplary embodiment illustrated in FIG. 7, in which identical elements bear the same references, mainly differs from the first example by way of the location of the root of the spacer tongues 54 of the mounting plate 40.

The root of each spacer tongue 54 is located between two successive tabs 46. Each spacer tongue 54 is offset radially toward the inside only with respect to the centering tabs 46 but not with respect to the retention tongues 44. In this example, there are two diametrically opposite spacer tongues 54. As an alternative, it is possible to provide a greater or smaller number of spacer tongues 54.

Figure 8:
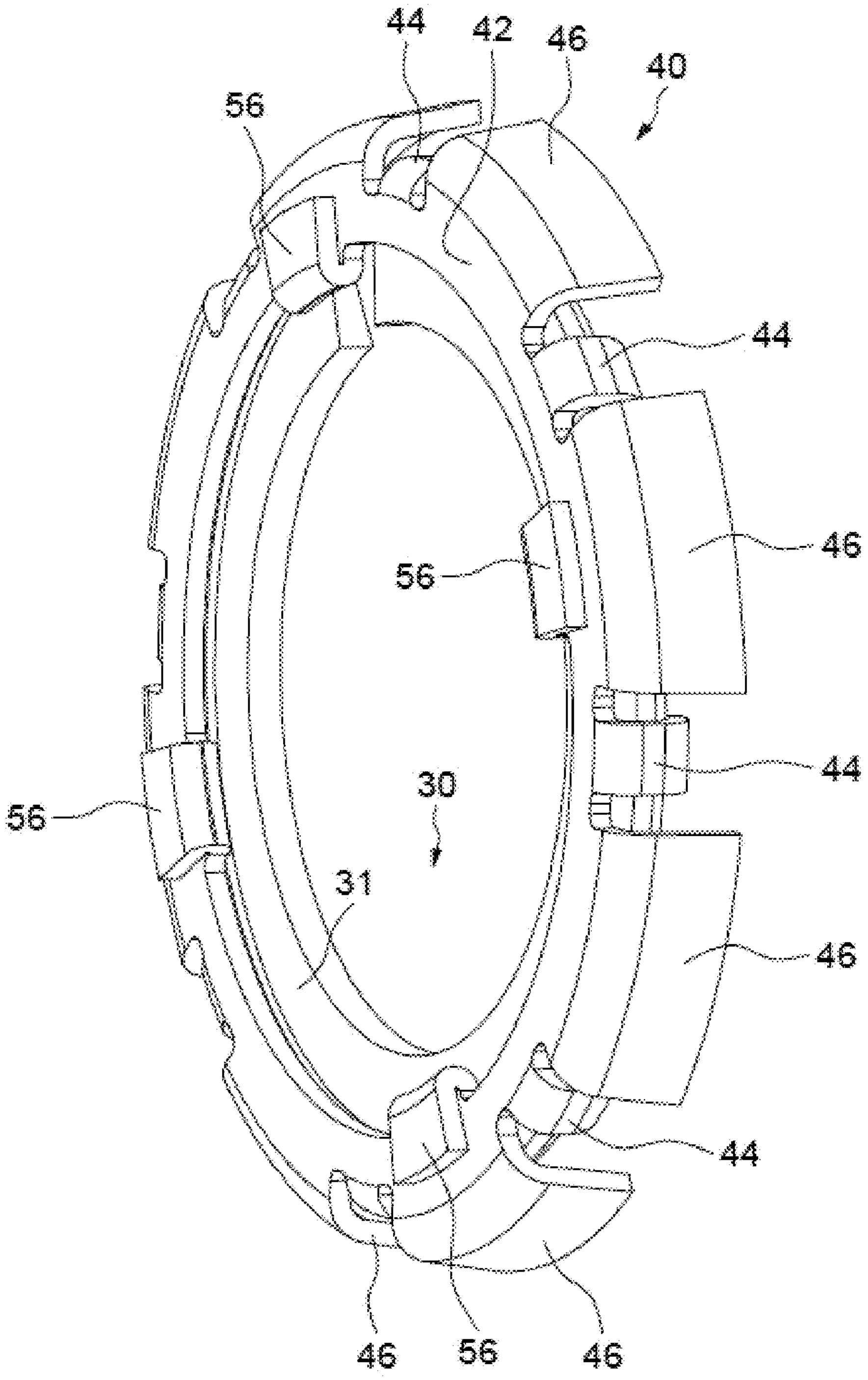
FIG. 8 is a rear perspective view of a grounding brush assembly according to a fourth exemplary embodiment of the invention.

The exemplary embodiment illustrated in FIG. 8, in which identical elements bear the same references, differs from the first example by the fact that the mounting plate 40 comprises spacer tongues 56, each extending from the radial portion 42 of the mounting plate 40 and being bent over axially against the radial portion 42. Each spacer tongue 56 is bent over against the external face of the radial portion 42. Each tongue 56 protrudes with respect to the radial portion 42 on the side opposite the support 32. Each spacer tongue 56 extends from the small-diameter edge of the radial portion 42. The root of each tongue 56 has a curved shape and the tongue 56 extends radially from this root. Each spacer tongue 56 is radially set back or offset from the large-diameter edge of the radial portion 42.

Each spacer tongue 56 is positioned in the circumferential direction in the extension of one of the tabs 46. Each spacer tongue 56 is positioned in the circumferential direction between two immediately successive retention tongues 44. Each spacer tongue 56 has a reduced circumferential dimension by comparison with that of the centering tabs 46. In this instance, each spacer tongue 56 has a circumferential dimension greater than that of the retention tongues 44. As an alternative, the circumferential dimension of the spacer tongues 56 may be smaller than or equal to those of the retention tongues 44.

The spacer tongues 56 are spaced apart from each other in the circumferential direction, in this instance evenly or regularly. As an alternative, it could be possible to provide an irregular or staggered circumferential spacing. In the exemplary embodiment illustrated, there are four spacer tongues 56. As an alternative, it is possible to provide a greater or smaller number of spacer tongues 56. Preferably, the number of tongues 56 is at least equal to two. The tongues 56 are in this case identical to one another. As a variant, the tongues 56 may have different shapes and/or dimensions.

In the illustrated exemplary embodiments, the mounting plate 40 of the grounding brush assembly 20 includes a plurality of centering tabs 46. Alternatively, the centering tabs may be replaced by an annular flange forming an annular centering portion.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers disposed within the support; and a brush mounting plate secured to the support of the brush, the mounting plate including a radial portion, the support being disposed against one side of the radial portion, at least one centering portion extending at least axially from the radial portion and offset radially outwardly with respect to the support, the centering portion having an outer surface defining the outside diameter of the mounting plate and engageable with a bore of a housing to center the grounding brush assembly, and at least one spacer tongue protruding from the radial portion of the mounting plate on an axial side opposite to the support and opposite to the at least one centering portion, the at least one spacer tongue being configured to maintain and/or establish an axial space between the grounding brush and a bearing or the housing.

2. The assembly according to claim 1, wherein the at least one spacer tongue of the mounting plate protrudes axially.

3. The assembly according to claim 1, wherein the at least one spacer tongue of the mounting plate is bent over axially against the radial portion of the mounting plate.

4. The assembly according to claim 1, wherein the mounting plate includes a plurality of retention tongues for retention of the support of the brush, the plurality of retention tongues extending from the radial portion of the mounting plate, the centering portion being offset radially outwardly with respect to the retention tongues and the at least one spacer tongue being distinct from the retention tongues and extending axially on the side opposite to the retention tongues.

5. The assembly according to claim 1, wherein the at least one spacer tongue of the mounting plate is offset radially inwardly with respect to the centering portion.

6. The assembly according to claim 1, wherein the at least one spacer tongue is integrally formed with the radial portion of the mounting plate.

7. The assembly according to claim 1, wherein the mounting plate includes at least two spacer tongues protruding from the radial portion on the side opposite the support of the brush, the two spacer tongues being diametrically opposite to each other.

8. The assembly according to claim 1, wherein the brush is mounted axially against the radial portion of the mounting plate.

9. The assembly according to claim 1, wherein the mounting plate is formed as a single piece.

10. An electric motor comprising:

a housing;

a shaft; and at least one grounding brush assembly according to claim 1 mounted radially between the housing and the shaft, the conductive fibers of the brush of the assembly being in contact with the shaft.

* * * * *